(No Model.) 2 Sheets—Sheet 1.
W. CASSILL.
COMBINED CORN PLANTER AND FERTILIZER DISTRIBUTER.
No. 305,738. Patented Sept. 30, 1884.
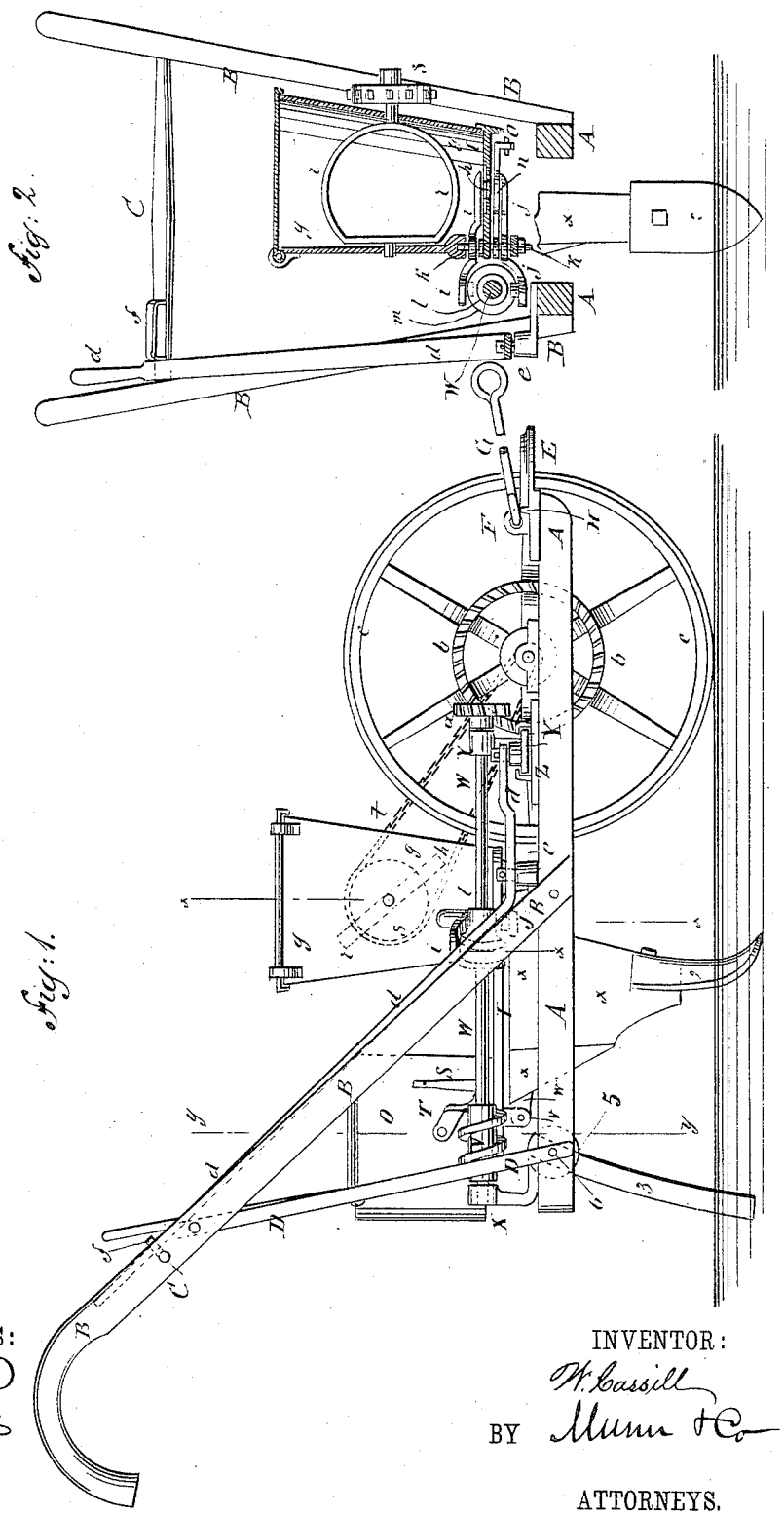
WITNESSES:
INVENTOR:
W. Cassill
BY Munn & Co
ATTORNEYS.

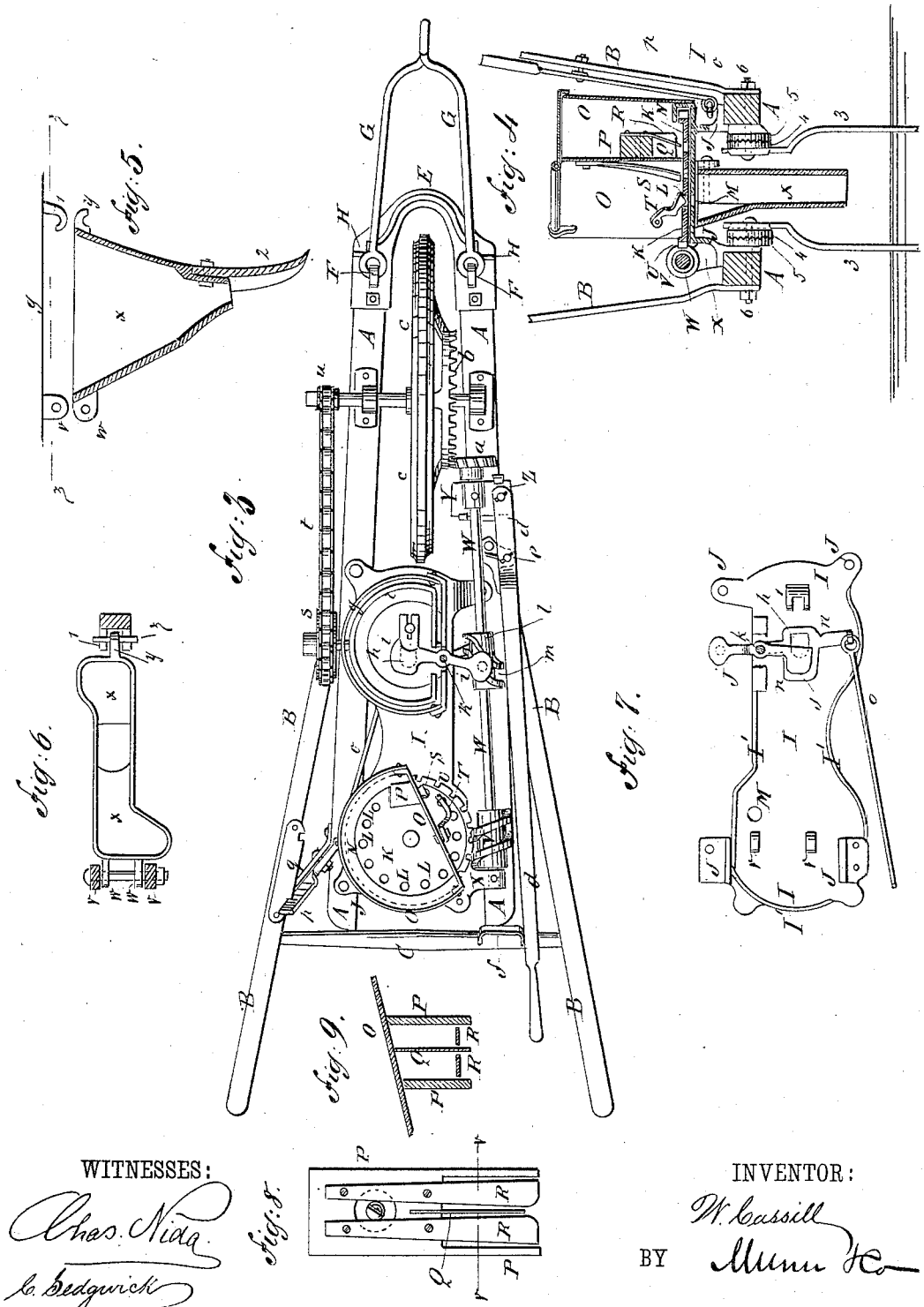

UNITED STATES PATENT OFFICE.

WILLIAM CASSILL, OF HAMDEN JUNCTION, OHIO, ASSIGNOR TO HIMSELF AND JOHN T. OGIER, OF SAME PLACE.

COMBINED CORN-PLANTER AND FERTILIZER-DISTRIBUTER.

SPECIFICATION forming part of Letters Patent No. 305,738, dated September 30, 1884.

Application filed October 22, 1883. (No model.)

*To all whom it may concern:*

Be it known that I, WILLIAM CASSILL, of Hamden Junction, in the county of Vinton and State of Ohio, have invented a new and useful Improvement in Combined Corn-Planters and Fertilizer-Distributers, of which the following is a full, clear, and exact description.

Reference is to be had to the accompanying drawings, forming part of this specification, in which similar letters of reference indicate corresponding parts in all the figures.

Figure 1, Sheet 1, is a side elevation of my improvement. Fig. 2, Sheet 1, is a sectional front elevation of the same, taken through the broken line $x\,x\,x$, Fig. 1. Fig. 3, Sheet 2, is a plan view of the same, the covers of the hoppers being removed and part being broken away. Fig. 4, Sheet 2, is a sectional front elevation of the same, taken through the line $y\,y$, Fig. 1. Fig. 5, Sheet 2, is a sectional side elevation of the conducting-spout and the furrow-opening plow, the spout-supports being shown in side view and detached. Fig. 6, Sheet 2, is a plan view of the spout, its supports being shown in section taken through the line $z\,z$, Fig. 5. Fig. 7, Sheet 2, is an under side view of the floor. Fig. 8, Sheet 2, is an elevation of the cut-off. Fig. 9, Sheet 2, is a sectional plan view of the same, taken through the line $v\,v$, Fig. 8.

The object of this invention is to improve the construction of the combined corn-planters and fertilizer-distributers for which Letters Patent No. 252,736 were issued January 24, 1882, William Cassill, inventor, in such a manner as to make them more convenient in use, and more reliable in operation.

The invention consists in the peculiar construction and arrangement of the parts, as hereinafter more fully set forth, and pointed out in the claim.

A represents the side bars of the machine, to the outer sides of the middle parts of which are attached the forward ends of the handles B. The rear parts of the handles B are connected and held at the proper distance apart by a round, C, and the said handles are supported at the proper height by the braces D, attached at their lower ends to the rear ends of the side bars, A, and at their upper ends to the handles B or round C.

To the forward ends of the side bars, A, are bolted the ends of the cast-iron bar E, which is curved to pass around the forward part of the drive-wheel and has lugs F formed upon its end parts, to which are hinged the ends of the bail G. The bail G has an eye at its center for the attachment of the draft, and its end parts rest upon flanges H, formed upon the end parts of the curved cast-iron bar E, so that the middle part of the said draft-bail G cannot drop down to allow the whiffletree to come in contact with the horse's heels.

I is the cast-iron floor, which is strengthened by a flange, I', formed along its rear end and side edges. Upon the lower side of the floor I are formed lugs or feet J to rest upon and be secured to the side bars, A. The feet J are made of such a length as to raise the floor I about two inches above the side bars, A.

To the rear part of the floor I is pivoted the seed-dropping disk K, through which, near its edge, is formed an annular row of holes, L, to receive seed and carry it to the discharge-opening M through the floor I. The edge of the seed-dropping disk K is covered by a rabbeted rim, N, to which the lower edge of the seed-hopper O is attached, and to which and the floor I the said hopper O is secured. The seed-hopper O is made in the form of a section of a cylinder, so that a part of the seed-dropping disk K will be outside of the said hopper, as shown in Figs. 3 and 4.

To the inner surface of that part of the straight side of the hopper O beneath which the seed-dropping holes L pass outward is attached the cut-off block P, the lower part of which is recessed, and the recess is divided into two compartments by a partition, Q. The inner side of the recess in the block P is covered with a spring, R, which may be made in two parts, as shown in Fig. 8, or in one piece slotted to receive the partition Q. The spring R prevents the seed-dropping disk K from carrying out any more kernels than enough to fill the holes L. As the filled holes L pass out from beneath the straight side of the hopper O, they pass beneath the free lower end of the spring S, the upper end of which is attached to the outer surface of the said straight side of the hopper O. The spring S is designed to smooth down and pack the kernels of grain in the holes L and push aside any stray kernels.

To the outer surface of the straight side of the hopper O is pivoted the end of an arm, T, which is made of such a length and shape that its outer end will be directly over the seed-dropping holes L as they come over the discharge-opening M in the floor I, so as to push the seed out of the holes L and cause the said seed to fall through the hole M, so that the said seed cannot become clogged in the said holes L and be carried back into the hopper O. Should any loose kernels rest upon the disk N, they will be carried by the said disk into contact with the straight side of the hopper O, and will be guided by the said side into such a position as to fall into the holes L and be carried back into the seed-hopper, so that there can be no waste of seed.

In the edge of the disk N are formed worm-teeth U, which mesh into the teeth of the worm V, attached to the shaft W. The rear end of the shaft W revolves in bearings X, attached to the rear end of a side bar A, or formed upon a lug or foot, J, of the floor I. The forward part of the shaft W revolves in a bearing, Y, which slides in a slot, Z, attached to one of the side bars A.

To the forward end of the shaft W is attached a small gear-wheel, $a$, the teeth of which mesh into the teeth of the gear-wheel $b$, formed upon or attached to the spokes of the drive-wheel $c$. The spokes of the drive-wheel $c$ are made with a lateral bend, so that the parts of said spokes to which the gear-wheel $b$ is attached will be outside of the plane of the rim of the said drive-wheel, as shown in Fig. 3. The rim of the drive-wheel $c$ can be made with a flat center part and concave side parts, as shown in Fig. 3; or it can be made flat or concaved, as may be desired. I prefer to form the rim with a corrugated or roughened surface to cause it to take a better hold upon the ground and prevent it from slipping.

To the sliding bearing Y, or to a stud attached to the said bearing, is pivoted the forward end of the lever $d$, which is fulcrumed to a stud, $e$, attached to the side bar A. At the rear side of the stud $e$ the lever $d$ is bent upward, so that its upper part will rest upon the round C. With this construction the gear-wheel $a$ can be readily thrown into and out of gear with the gear-wheel $b$ by operating the lever $d$. The lever $d$ is held in either position by a catch, $f$, attached to the round C.

To the forward part of the floor I is attached the fertilizer-hopper $g$, which is made in the shape of a flaring cylinder with one flat side, the flat side being next the shaft W.

In the floor I, at the center of the hopper $g$, is formed a discharge-opening, $h$, which is covered upon the upper and lower sides of the said floor I by cut-off slides $i j$, which are pivoted to a pin, $k$, attached to the straight side of the hopper $g$ and to the floor I, the upper slide, $i$, passing out through the said hopper $g$. The outer ends of the slides $i j$ are curved to pass the one upon the upper side and the other upon the lower side of the cylinder $l$ attached to the shaft W, and have pins formed upon or attached to their outer ends to enter a cam-groove, $m$, in the said cylinder $l$, which groove passes spirally along the opposite sides of the cylinder $l$ and then parallel with the ends in semicircular arcs. By this construction as the machine is drawn forward the slide $i$ is withdrawn from the opening $h$ to allow the fertilizer to enter and fill the said opening, and then the upper slide is moved back over the said opening and the lower slide, $j$, is withdrawn from the opening $h$, allowing the fertilizer to drop to the ground, one of the said slides being always over the opening $h$ when the other slide is withdrawn from the said opening.

The discharge-opening $h$ can be closed when desired by a slide, $n$, interposed between the floor I and the slide $j$. The slide $n$ is pivoted at one end to the pin $k$, and to its other end is pivoted the forward end of a connecting-rod, $o$, the rear end of which is pivoted to the lower end of the lever $p$. The lever $p$ is pivoted to a brace, D, of a handle, B, so that by operating the lever $p$ the slide $n$ can be adjusted to open and close the discharge-opening, as may be required. The upper part of the lever $p$ moves along a notched catch-bar, $q$, attached to the handle B, so that the slide $n$ will be held securely in either position into which it may be adjusted.

To the middle parts of the sides of the hopper $g$ is pivoted a stirrer-ring, $r$, which is made of such a shape and size as to fit into and revolve in the said hopper $g$.

To one of the pivots of the stirrer $r$ is attached a small chain-wheel, $s$, around which passes an endless chain, $t$. The chain $t$ also passes around a smaller chain-wheel, $u$, attached to a journal of the drive-wheel $c$, so that the stirrer will be revolved by the revolution of the said drive-wheel.

To the rear part of the lower side of the floor I are attached or upon it are formed two lugs, $v$, to and between which are pivoted lugs $w$, formed upon or attached to the rear end of the top of the conducting-spout $x$, to the forward end of which is attached a hook-lug, $y$, to hook upon a wooden break-pin, $z$, laid upon a forked hook-lug, 1, attached to or formed upon the lower side of the forward part of the floor I. The top of the spout $x$ is made long, so that the said spout can receive seed from the hopper O and fertilizer from the hopper $g$. The bottom of the spout $x$ is made small, so that the seed and fertilizer will be dropped to the ground in a bunch.

To the forward side of the lower end of the spout $x$ is bolted a plow, 2, to open a furrow to receive the seed and fertilizer. With this construction in case the plow 2 should strike an obstruction the pin $z$ will break and allow the plow 2 and spout $x$ to swing back to prevent the said plow and spout from being broken.

If desired, the hook-lugs y 1 and the break-pin z can be replaced by a spring catch-bolt, which will yield and allow the hopper g and plow 2 to swing back should the plow strike an obstruction, and which, when the hopper g is swung forward, will fasten the said hopper in place automatically.

The seed and fertilizer are covered with soil by two coverers, 3, to the outer sides of the upper ends of which are attached disks 4, made with radially-corrugated faces to engage with similarly-faced disks 5, attached to the rear ends of the side bars, A, or to the lugs J and side bars, A, by bolts 6, so that by loosening the said bolts the coverers 3 can be readily adjusted at any required pitch, and when adjusted will be firmly held in place.

Having thus fully described my invention, I claim as new and desire to secure by Letters Patent—

In a combined corn-planter and fertilizer-distributer, the combination, with the hopper O and the seed-dropping disk K, of the recessed block P, the partition Q, and the spring R, substantially as herein shown and described, whereby the said disk is kept from carrying out any more seed than enough to fill its seed-carrying holes, as set forth.

WILLIAM CASSILL.

Witnesses:
FRED BAKER,
G. F. W. OSCAR MEESE.